(12) United States Patent
Wold

(10) Patent No.: US 7,690,682 B2
(45) Date of Patent: Apr. 6, 2010

(54) FOLDING METHOD FOR DOOR MOUNTED INFLATABLE CURTAIN

(75) Inventor: Dana Wold, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/215,632

(22) Filed: Jun. 27, 2008

(65) Prior Publication Data

US 2009/0322065 A1   Dec. 31, 2009

(51) Int. Cl.
*B60R 21/16* (2006.01)
(52) U.S. Cl. .................................. 280/743.1
(58) Field of Classification Search ............. 280/730.2, 280/743.1
See application file for complete search history.

(56) References Cited

U.S. PATENT DOCUMENTS

| 5,333,899 A * | 8/1994 | Witte ..................... 280/730.2 |
| 5,425,551 A * | 6/1995 | Hawthorn ................. 280/743.1 |
| 5,524,924 A * | 6/1996 | Steffens et al. ........... 280/730.2 |
| 5,718,449 A * | 2/1998 | Numazawa et al. ...... 280/730.2 |
| 6,231,070 B1 | 5/2001 | Sunabashiri et al. |
| 6,499,765 B2 * | 12/2002 | Hawthorn et al. ........ 280/743.1 |
| 6,789,821 B2 | 9/2004 | Zink et al. |
| 7,156,418 B2 | 1/2007 | Sato et al. |
| 2006/0061072 A1 * | 3/2006 | Suekuni et al. .......... 280/730.2 |

FOREIGN PATENT DOCUMENTS

JP  2007-137103  6/2007

* cited by examiner

*Primary Examiner*—Paul N Dickson
*Assistant Examiner*—Robert A Coker
(74) *Attorney, Agent, or Firm*—Sally J Brown; Madson IP, P.C.

(57) ABSTRACT

A method of folding or compacting a door-mounted inflatable curtain airbag to reduce the overall length of the airbag for positioning onto a vehicle. The airbag may generally be substantially parallellogrammatical in shape. The method involves a two-step process (1) folding the airbag along an axis that is substantially normal to the rear edge (first edge) of the airbag and (2) subsequently folding the airbag radially to compact the airbag down into its final, storable position. The present methods allow folding, compaction of the airbag without having a fold that is parallel to the compacted length of the airbag.

17 Claims, 4 Drawing Sheets

FOLDING METHOD FOR DOOR MOUNTED INFLATABLE CURTAIN

BACKGROUND OF THE INVENTION

Airbag and airbag systems have been used for years. In fact, these systems are now mandatory on new vehicles. These systems have been credited with saving literally thousands of lives and dramatically increasing automotive safety.

One type of airbag system that has received recent attention is the so-called "inflatable curtain" airbag. (These airbags are also referred to as "inflatable cushion" airbags as well). These airbags are positioned proximate the vehicle's door or side and are designed to inflate in the event of an accident. When this type of airbag is inflated, it will cover the door and lateral side of the vehicle, thereby preventing the vehicle occupant from harmful impact with the door or side of the vehicle during a crash. Such inflatable curtain airbag systems may also ensure that the all or a portion of the occupant's body is not ejected out of the vehicle during a crash. Accordingly, because of the added safety associated with inflatable curtain airbags, these types of airbag systems have also become standard on many new vehicles.

Oftentimes, inflatable curtain airbags are positioned in the vehicle's roof rail proximate the vehicle door. Such airbags, when inflated, will be lowered down from the vehicle's roof and are positioned between the vehicle occupant and the vehicle door. However, such a design is not possible for certain makes/models of cars. Accordingly, for these types of vehicles, inflatable curtain airbag systems have been mounted within the vehicle door. This type of airbag is often referred to as a "door mounted inflatable curtain" or a "DMIC".

Currently, DMICs are designed such that the length of the DMIC airbag is greater than the length of the space into which they are inserted onto the vehicle door. Accordingly, in order to position the DMIC, the DMIC must be folded. FIGS. 1A through 1C show this folding process in greater detail. Specifically, FIG. 1A shows the unfolded DMIC airbag 2. The airbag 2 includes a leading edge 3a, a rear edge 3b, a top edge 3c, and a bottom edge 3d. As shown in FIG. 1B, a triangular portion 4 of the airbag 2 is folded over (along fold 5) to reduce the length 6 of the airbag 2. Accordingly, the rear edge 3b is positioned on the interior of the airbag 2. Once the length 6 has been reduced, the airbag 2 will have a length small enough to fit into the area of the vehicle door designated to receive the airbag 2. It should be noted that when the triangular portion 4 is folded over, the airbag 2 has an overall trapezoidal shape (see FIG. 1B). After the length 6 has been reduced, the airbag 2 may be further compacted by having the top edge 3c be folded towards the bottom edge 3d via folds 7.

FIG. 2 shows the airbag 2 mounted onto a vehicle door 10. In FIG. 2, the airbag 2 is shown as it is being inflated. As known in the industry, the inflated airbag 2 may have one or more seams 9, as desired. For purposes of clarity, a plane 12 is shown on FIG. 2 to indicate the folded over portion 4—i.e., the portion of the airbag 2 that must be folded over in order to reduce the length of the airbag 2 so that the airbag 2 can fit into the area of the door 10 designed to receive this feature. When inflated, the airbag 2 becomes positioned in the vehicle interior 20 in a position that will prevent the occupant from harmful impact with the door 10, the window (not shown), the lateral side, and/or other portions of the vehicle interior 20.

Referring now to FIGS. 1A-1C and FIG. 2, it will be noted that the position of the DMIC airbag 2 may be such that it is positioned as far to the rear of the door 10 as possible. This is needed to minimize the size of the folded over portion 4. The packing length of the compacted (folded) airbag 2 should be kept as long as possible in order to avoid, if possible, the need for a similar type of folded over portion 4 proximate the leading edge 3a of the airbag 2. Typical coverage area for the DMIC airbag 2 is between 550 to 650 square millimeters depending upon the particular embodiment. The area of the folded over portion 4 may be between 150 and 200 square millimeters. Of course, an inflator (not shown) would be used to inflate the airbag 2. The type, size, and features of the inflator that would be used will depend upon the particular embodiment and are well known to those skilled in the art. The exact position of the inflator on the vehicle could vary depending upon the design of the vehicle. Particularly, the position of the inflator may be modified, as needed, to ensure that the inflator does not contact a dummy thorax (or other portions of the crash test dummy) during testing.

It should be noted that the use of a folded over portion 4 may be undesirable in certain applications. For example, the folded over portion 4 means that there is a fold 5 that is parallel to the compacted length 11. This compacted length 11 must be first unfolded (uncompacted) before the portion 4 may be unfolded along the fold 5. Such a configuration increases the complexity of the system and may also increase the time required for the airbag 2 to properly inflate into position. Accordingly, a larger or stronger inflator may be required in order to ensure that the airbag 2 deploys within the desired time. Further, the folded over portion 4 may also cause issues with respect to the kinematics of deployment. Accordingly, engineers and testers are required to configure the airbag 2 to ensure that the airbag 2 will deploy properly.

Accordingly, it would be an advancement to find a new way of folding a DMIC airbag that would not create a folded over portion. Such a method is taught herein.

BRIEF SUMMARY OF THE INVENTION

The present embodiments relate to methods of folding (or compacting) a door mounted inflatable curtain airbag for positioning within a vehicle. More specifically, the present embodiments are designed to eliminate the folded over portion discussed above in conjunction with FIGS. 1B-1C. Accordingly, the present embodiments, will generally inflate faster.

The DMIC airbag is generally parallogrammatical in shape. Accordingly, the airbag will have 4 sides and 4 angles, each angle having a vertex. The airbag is generally folded in a direction that is substantially normal to the rear edge to create a first set of folds. This first set of folds may be multiple folds (such as accordion folds, roll folds, etc.) or may be a single fold. The last fold in the first set of folds will contact a vertex of the rear edge.

Once the first set of folds have been formed, a second set of fold will likewise be formed. This folding, which results in a second set of folds, occurs by in a radial direction about a vertex acting as a pivot point. Each of these radial folds will include the vertex pivot point. The pivot point will be located at the same vertex of the rear edge to which the first set of folds is folded.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 2:
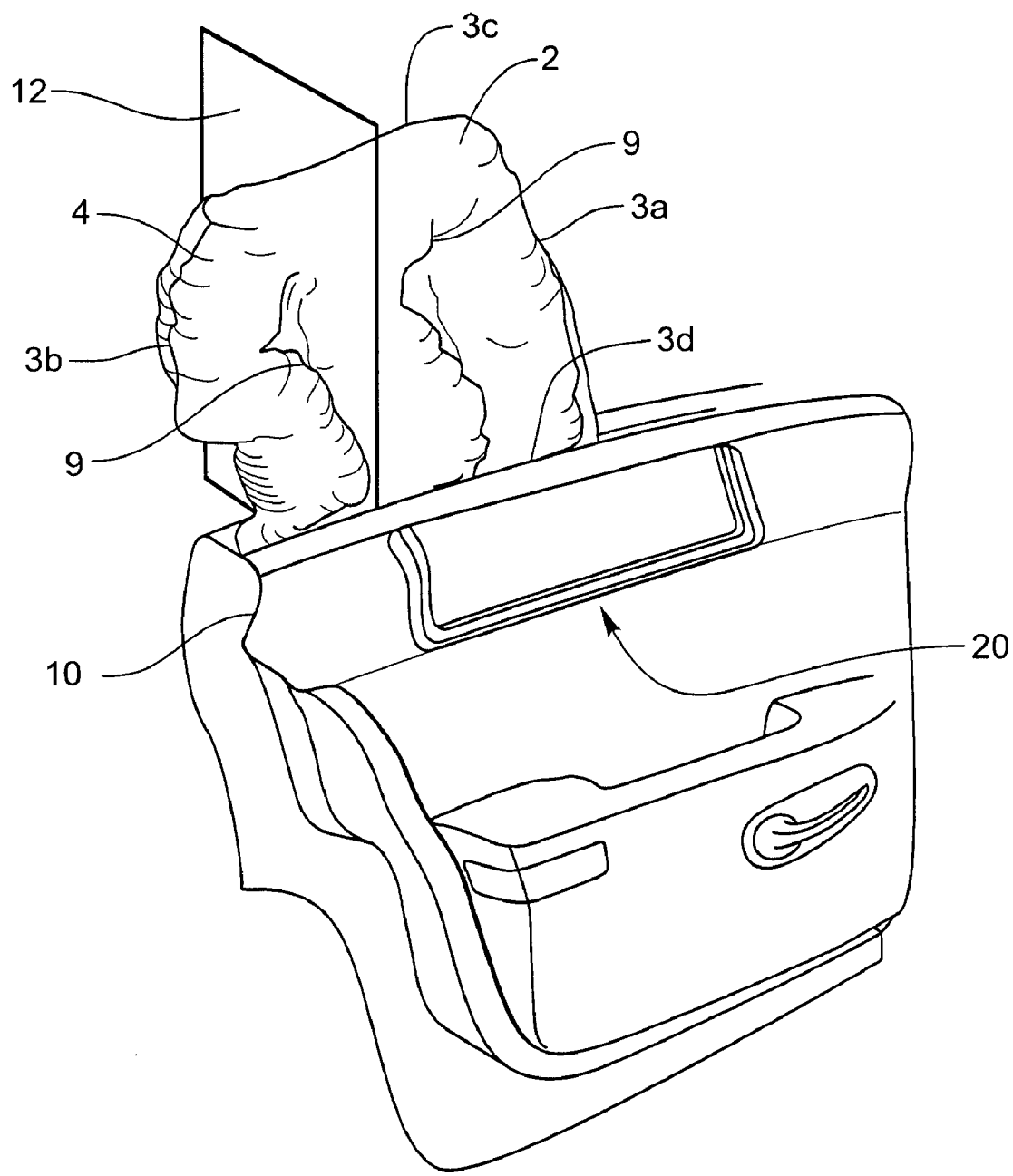
FIG. 2 is a perspective view of the DMIC airbag of FIG. 1A mounted onto a vehicle door, the airbag being shown as it is being deployed into its inflated configuration.
Figure 3A:
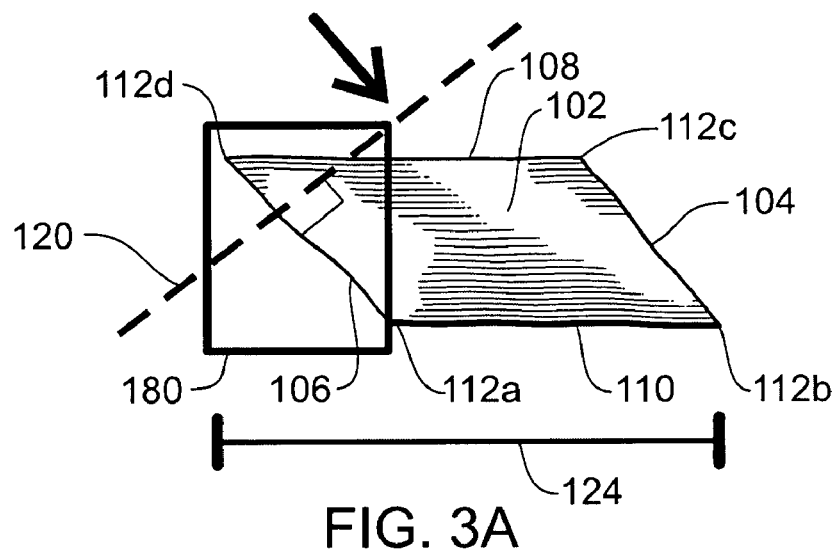
FIG. 3A is a plan view of a DMIC airbag according to the present embodiments, the airbag being shown in its unfolded and uninflated configuration

FIG. 3A is a plan view of an airbag 102. This airbag 102 is generally a DMIC (door mounted inflatable curtain) airbag. Accordingly, this airbag is designed to be mounted into a vehicle door 10 (shown in FIG. 2) and will inflate and deploy to cover the door 10 or lateral side of the vehicle during a crash. Those skilled in the art will appreciate how the DMIC airbag 102 may be constructed and mounted to the vehicle door 10. In general, the DMIC airbag 102 will not be visible when the airbag 102 is in its stowed, undeployed configuration (i.e., it will be hidden within a portion of the door of the vehicle). However, during a crash, the DMIC airbag 102 will become inflated and positioned within the vehicle interior 20 (shown in FIG. 2) in a position that is designed for protecting the vehicle occupant. As is known in the industry, an inflator (not shown) may be used to deploy/inflate the airbag 102. The positioning and size of the inflator, as well as the way in which the gas may be channeled from the inflator into the airbag 102 is known in the art. Specifically, the exact position of the inflator on the vehicle could vary depending upon the design of the vehicle. Particularly, the position of the inflator may be modified, as needed, to ensure that the inflator does not contact a dummy thorax (or other portions of the crash test dummy) during testing.

When the airbag 102 is unfolded and in its uninflated configuration, the airbag 102 may be shaped as a parallelogram (or substantially shaped as a parallelogram). Other embodiments may be designed in which only the top and bottom edges are parallel or substantially parallel. Accordingly, the airbag 102 will have four edges, including a first edge 106. In the embodiment of FIG. 3A, the first edge 106 is also the rear edge of the parallelogrammatical shape. The leading edge 104, the top edge 108, and the bottom edge 110 are also illustrated. It should be noted that the first edge 106 does not necessarily have to be the rear edge. Other embodiments may be designed in which the first edge 106 is one of the other edges of the airbag 102, not the rear edge.

The airbag 102 also includes a series of interior angles. Specifically, the airbag 102 includes a first interior angle 112a, a second interior angle 112b, a third interior angle 112c, and a fourth interior angle 112d. Each angle will have a vertex.

For purposes of reference, an axis 120 is shown in FIG. 3A. This axis is normal (perpendicular) or substantially normal to the first edge 106 which, in the embodiment of FIG. 3A, may be the rear edge 106. Because the airbag 102 is substantially parallelogrammatical in shape, the axis 120 is also normal or substantially normal to the leading edge 104 as well.

The airbag 102 has an overall length 124 that may be greater than the corresponding length of the area of the door 10 into which the airbag 102 may be mounted. Accordingly, the airbag 102 must generally be folded (compacted) to reduce the length of the airbag 102 so that the airbag 102 may be positioned properly in the door 10.

Figure 3B:
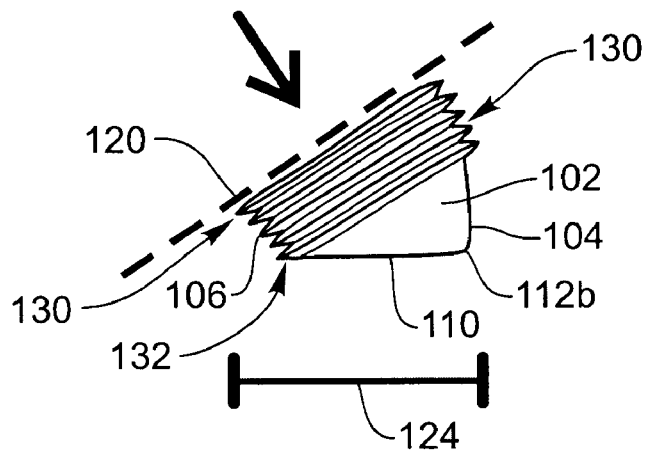
FIG. 3B is a plan view of the way in which the DMIC airbag of FIG. 3A may be folded.

The way in which the airbag 102 may be folded will now be explained. Referring now to FIG. 3B, the first step in the folding process in illustrated. Specifically, the first step in the compacting process is to fold the airbag 102 along the axis 120. In other words, the DMIC airbag 102 is folded in any manner known in the industry for folding compaction of airbags including (accordion folding (sometimes called "z-folding"), rolling, a roll-fold combination, compression fold, tucking, compressing, gathering, bunching, etc. or even combinations of the foregoing). The DMIC airbag 102 is folded generally in a direction normal (or substantially normal) to the first edge 106 of the airbag 102. (Again, in this embodiment, the rear edge 106 is the first edge 106, although other embodiments may be configured differently).

The folding of the DMIC airbag 102 along the axes 120 creates a first set of folds 130. It should be noted that the first set of folds 130 may, in some embodiments, only be one fold. However, in other embodiments, multiple folds are used to construct the first set of folds 130.

Figure 1A:
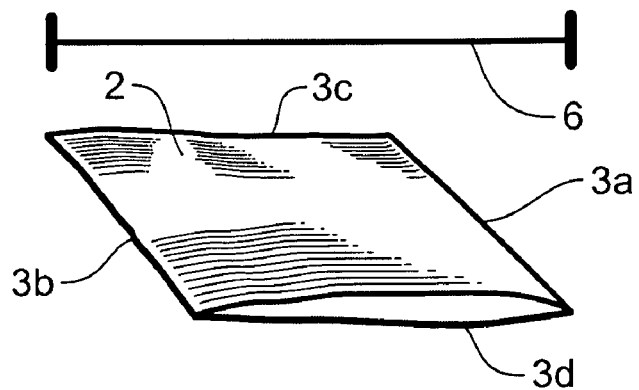
FIG. 1A is a plan view of a prior art version of a DMIC airbag, the airbag being shown in its unfolded and uninflated configuration.
Figure 1B:
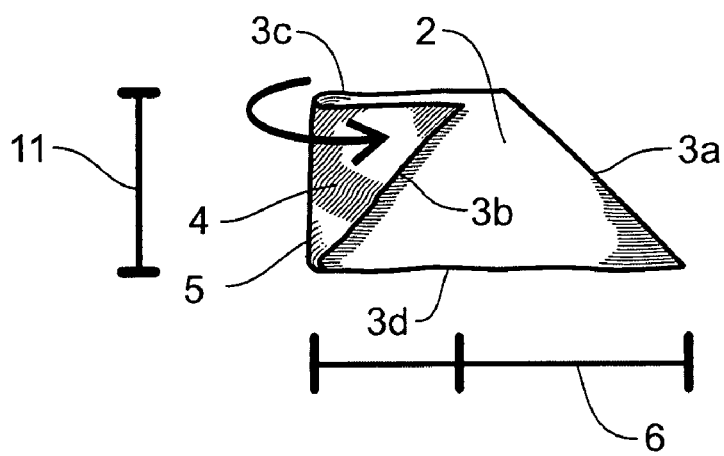
FIG. 1B is a plan view of the DMIC airbag of FIG. 1A, wherein a portion of the airbag has been folded over.
Figure 1C:
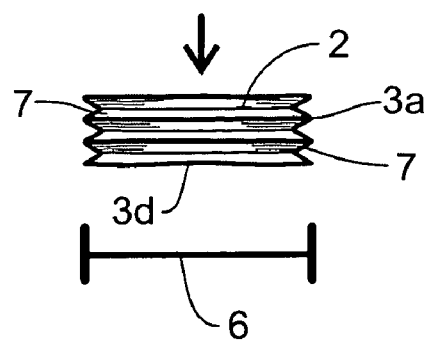
FIG. 1C is a view of the DMIC airbag of FIG. 1B after it has been compacted into its fully folded configuration.

Folding the airbag 102 to create the first set of folds 130 brings the airbag 102 to the configuration shown in FIG. 3B. Note, unlike that which is shown in FIGS. 1A-1C, the airbag 102 does not have a "folded over" portion—i.e., a portion of the airbag that is folded over other portions to reduce the length. Rather, the airbag 102 is simply folded along the axis 120 without first creating a folded over portion. The airbag 102 will be folded (compacted) along the axis 120 until the last fold 132 in the first set of folds 130 reach/contact the bottom edge 110 or vertex of the first angle 112a.

Figure 3C:
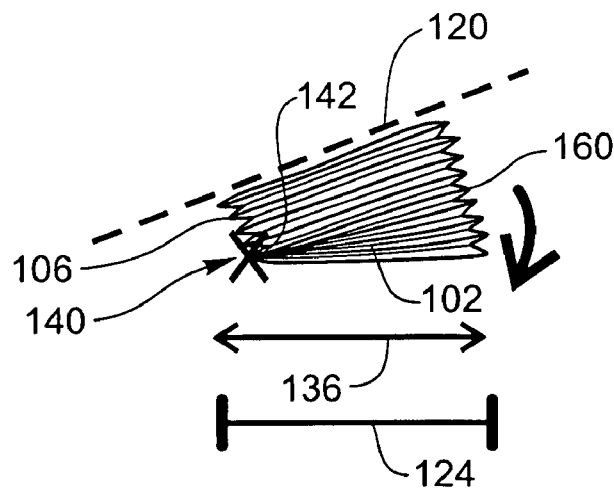
FIG. 3C is a plan view that shows the DMIC airbag of FIG. 3A showing how it may be fully folded and compacted into its desired configuration.

Referring now to FIG. 3C, the second step of the folding method for the airbag 102 is illustrated. Subsequent to folding the airbag 102 along the axes 120, the airbag 102 is folded (such as via accordion folding, compression folding, or a combination of the foregoing) in a radial direction 136. More specifically, the airbag 102 may be folded generally radially about a pivot point 140 (designated as an "X"). In some embodiments, the pivot point 140 is positioned proximate a vertex 142 of the first edge 106. (The vertex 142 may be the vertex of first angle 112a of FIG. 3A). In other embodiments, the pivot point 140 is positioned at the first edge 106. Of course, other positions for the pivot point 140 may also be used, as desired. Such radial folding of the airbag 102 brings the airbag 102 into its final, stored configuration. This radial folding of the airbag creates a second set of folds 160. Each of the folds in the second set of folds 160 may contact or include the pivot point 140. In some embodiments, there is only one fold in the second set of folds 160. In other embodiments, more than one fold is used to comprise the second set of folds 160. The number of folds used to construct the second set of folds 160 may depend upon the size of the vehicle and the space provided on the vehicle door onto which the airbag 102 is to be mounted.

It will readily be apparent that the embodiment of the airbag 102 lacks any sort of folded over portion 4 (shown in FIG. 1B)—i.e., a portion of the airbag that is folded over the airbag in to reduce the length of the airbag. This means that there is a fold (as shown in FIG. 1B) that is non-parallel to the axes 120. In other words, there is no triangular portion of the airbag that must first be folded (thereby converting the airbag into a trapezoidal shape) as described above in conjunction with FIG. 1A-1C. When this folded airbag is deployed, the entire compacted length 11 must be unfolded before the portion 4 may be unfolded along the fold 5 (as discussed above in conjunction with FIGS. 1A-1C). Such a configuration acts to retard the unfolding process and slow down the deployment because the compacted length must be first unfolded (uncompacted) before the portion may unfold along the fold 5. However, such a configuration does not exist in the embodiments of FIGS. 3A-3C. Thus, the problems detailed herein associated with having a folded over portion 4 in the DMIC airbag are obviated. Accordingly, the DMIC airbag will deploy quicker and with less difficulty. For purposes of reference, FIG. 3A includes a rectangle 180 that indicates the portion of the airbag 102 that would have been folded over (to create the folded over portion) but for the use of the present embodiments. The fold lines 130 of FIGS. 3A-3C are generally parallel to the axis 130, and there is no fold that is generally parallel to the direction of the compacted length 11 (shown in FIG. 1B). However, as described herein, the airbag 102 is compacted/folded in another manner so that the portion of the airbag 102 within the box 180 is not folded over.

Figure 4A:
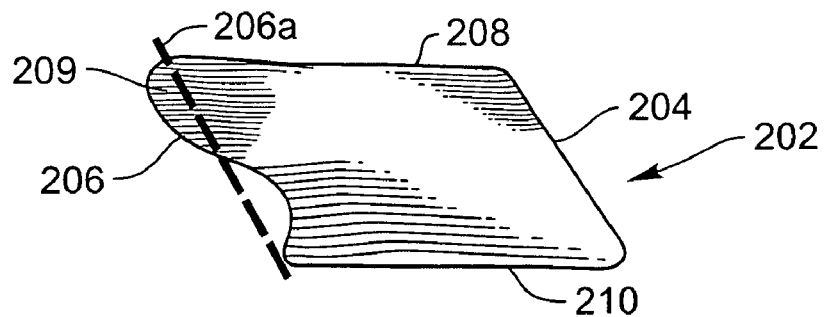
FIG. 4A is a plan view of another embodiment of a DMIC airbag.

FIGS. 4A-4D disclose a second embodiment of an airbag 202 that is similar to that which is described above. Specifically FIG. 4A shows the airbag 202 in its flat, completely unfolded configuration. The airbag 202 may be a DMIC airbag 202. As shown in FIG. 4A, the top edge 208 and the bottom edge 210 are substantially parallel. There is also a front edge 204. However, the rear edge 206 is curved (such that the rear edge 206 is not generally parallel to the front edge 204), making the airbag 202 non-parallelogrammatical in shape. Any type of curve or curving edge may be used. In order to fold the airbag 202 in accordance with the present invention, the airbag initially needs to be folded such that it has a generally parallelogrammatical shape. For reference, an "ideal" fold line 206a is shown. This ideal fold line 206a is oriented so that the shape of the airbag 202 would be substantially parallelogrammatical in shape if the fold line 206a is used, at least in part, as the folded rear edge 207. In other words, the ideal fold line 206a would be generally parallel to a front edge 204 (the second edge).

Figure 4B:
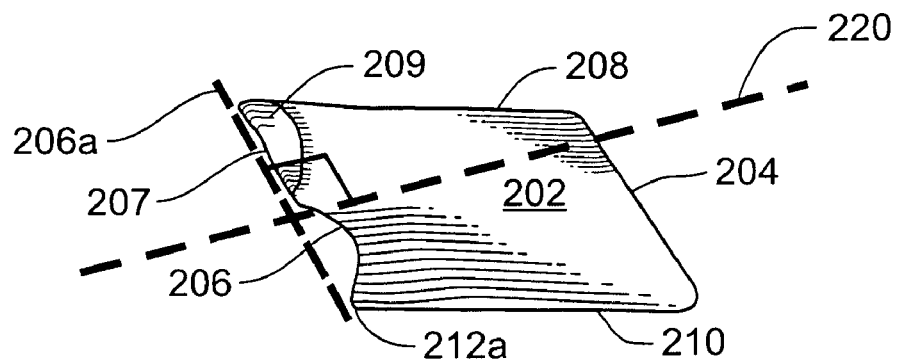
FIG. 4B is a plan view of the embodiment of FIG. 4A in which a portion of the rear edge has been folded over.
Figure 4C:
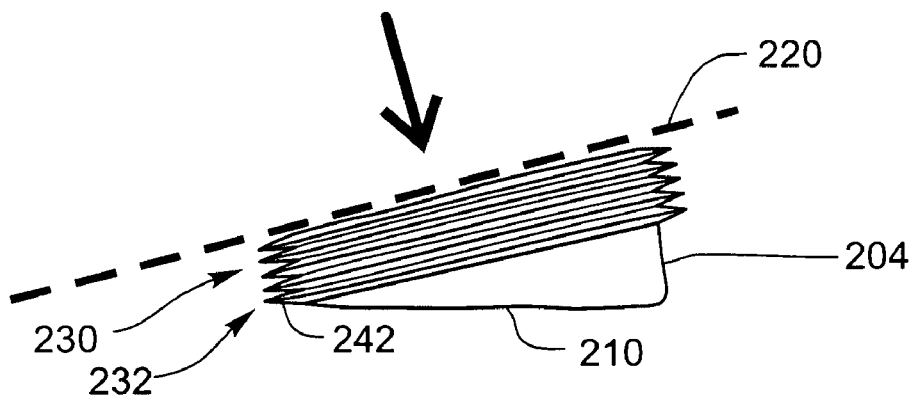
FIG. 4C is a plan view of the way in which the DMIC airbag of FIG. 4A may be folded.
Figure 4D:
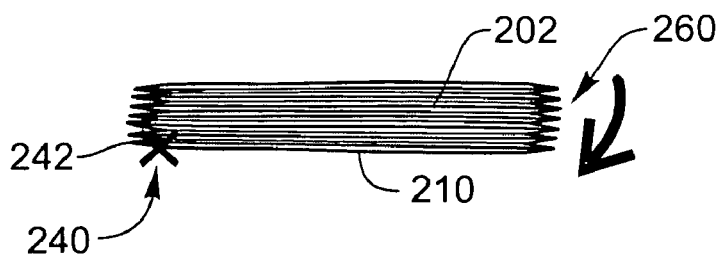
FIG. 4D is a plan view that shows the DMIC airbag of FIG. 4A showing how it may be fully folded and compacted into its desired configuration.

FIGS. 4B-4D show the way in which this airbag 202 may be folded. As shown in FIG. 4B, a portion 209 may be folded over itself along the ideal fold line 206a so that there is a portion of the airbag 202 that overlaps. Then, as shown in FIG. 4C, the airbag 202 is folded along one or more axes 220 that is substantially normal (or normal) to the ideal fold line 206a in a manner described above.

The folding of the DMIC airbag 202 along the axes 220 creates a first set of folds 230. It should be noted that the first set of folds 230 may, in some embodiments, only be one fold. However, in other embodiments, multiple folds are used to construct the first set of folds 230.

Folding the airbag 202 to create the first set of folds 230 brings the airbag 202 to the configuration shown in FIG. 4C. The airbag 102 is folded (compacted) along the axis 120 until the last fold 232 in the first set of folds 230 reach/contact the vertex 242 of the first angle 212a.

Subsequently, as shown in FIG. 4D, the airbag 202 is radially folded about a pivot point 240 proximate the vertex 242 to create a second set of folds 260.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method of compacting a door-mounted airbag, the airbag having a first edge, a first interior angle with a vertex, the airbag having a top edge and bottom edge that are substantially parallel, the method comprising:
    folding the airbag along an axis that is substantially normal to the first edge to create a first set of folds so that the first set of folds has a last fold, wherein the last fold in the first set of folds defines a pivot point proximate the vertex; and
    subsequently radially folding the airbag about the pivot point proximate the vertex to create a second set of folds.

2. A method as in claim 1 wherein the pivot point is positioned at the first edge.

3. A method as in claim 2 wherein the pivot point is positioned at the vertex.

4. A method as in claim 3 wherein the pivot point is positioned at a vertex of the airbag.

5. A method as in claim 1 wherein the first set of folds is comprised of more than one fold.

6. A method as in claim 1 wherein the second set of folds is comprised of more than one fold.

7. A method as in claim 1 wherein the folds used to form the first set of folds may be an accordion fold, a roll fold, a compression fold, or any combination thereof.

8. A method as in claim 1 wherein the radial fold used to form the second set of folds may be an accordion fold, a compression fold, or any combination thereof.

9. A method as in claim 1 wherein the airbag lacks a fold that has a direction parallel to a compacted length.

10. A door-mounted airbag comprising a first edge, a first interior angle with a vertex, the airbag having a top edge and bottom edge that are substantially parallel, wherein the airbag is folded along an axis that is substantially normal to the first edge to create a first set of folds, wherein a last fold in the first set of folds contacts the vertex, the airbag also being radially folded about a pivot point to create a second set of folds.

11. An airbag as in claim 10 wherein the pivot point is positioned at the first edge.

12. An airbag as in claim 10 wherein the pivot point is positioned at the vertex.

13. An airbag as in claim 10 wherein the first set of folds is comprised of more than one fold.

14. An airbag as in claim 10 wherein the second set of folds is comprised of more than one fold.

15. An airbag as in claim 10 wherein the folds used to form the first set of folds may be an accordion fold, a roll fold, a compression fold, or any combination thereof.

16. An airbag as in claim 10 wherein the radial fold used to form the second set of folds may be an accordion fold, a compression fold, or any combination thereof.

17. A method of compacting a door-mounted airbag, the airbag having a first edge, a first interior angle with a vertex, the airbag having a top edge and bottom edge that are substantially parallel and an overall length greater that the length of the bottom edge, the method comprising:

folding the airbag along an axis that is substantially normal to an ideal first edge to create a first set of folds, wherein a last fold in the first set of folds is proximate the vertex, wherein the ideal first edge is the edge that would exist if the airbag had the first edge parallel to a second edge; and subsequently radially folding the airbag about a pivot point proximate the vertex to create a second set of folds, thereby reducing the overall length of the airbag as folded to approximately the length of the bottom edge.

* * * * *

UNITED STATES PATENT AND TRADEMARK OFFICE
CERTIFICATE OF CORRECTION

| | | |
|---|---|---|
| PATENT NO. | : 7,690,682 B2 | Page 1 of 1 |
| APPLICATION NO. | : 12/215632 | |
| DATED | : April 6, 2010 | |
| INVENTOR(S) | : Dana Wold | |

It is certified that error appears in the above-identified patent and that said Letters Patent is hereby corrected as shown below:

In column 8, claim 17, line 2, please replace "greater that the" with --greater than the--

Signed and Sealed this

Eighteenth Day of May, 2010

David J. Kappos
*Director of the United States Patent and Trademark Office*